US011221316B2

(12) United States Patent
Ollier et al.

(10) Patent No.: US 11,221,316 B2
(45) Date of Patent: Jan. 11, 2022

(54) HEAT FLUX SENSOR WITH HEATING WIRE

(71) Applicants: COMMISSARIAT A L'ENERGIE ATOMIQUE ET AUX ENERGIES ALTERNATIVES, Paris (FR); Apix Analytics, Grenoble (FR)

(72) Inventors: Eric Ollier, Grenoble (FR); Eric Colinet, Grenoble (FR)

(73) Assignees: COMMISSARIAT A L'ENERGIE ATOMIQUE ET AUX ENERGIES ALTERNATIVES; Apix Analytics

(*) Notice: Subject to any disclaimer, the term of this patent is extended or adjusted under 35 U.S.C. 154(b) by 99 days.

(21) Appl. No.: 16/709,320

(22) Filed: Dec. 10, 2019

(65) Prior Publication Data

US 2020/0182838 A1 Jun. 11, 2020

(30) Foreign Application Priority Data

Dec. 11, 2018 (FR) ..................................... 1872647

(51) Int. Cl.
*G01N 30/66* (2006.01)
*G01F 1/688* (2006.01)
(Continued)

(52) U.S. Cl.
CPC ........... *G01N 30/66* (2013.01); *G01F 1/6882* (2013.01); *G01N 25/18* (2013.01); *G01N 2030/025* (2013.01)

(58) Field of Classification Search
CPC .. G01N 30/66; G01N 25/18; G01N 2030/025; G01N 2291/02881;
(Continued)

(56) References Cited

U.S. PATENT DOCUMENTS 3,775,843 A * 12/1973 Wendt, Jr. .............. H01C 7/045
29/612
5,656,773 A * 8/1997 Neda ..................... G01F 1/6845
73/204.26
(Continued)

FOREIGN PATENT DOCUMENTS

EP 2711696 A1 3/2014
FR 2995690 A1 3/2014
(Continued)

OTHER PUBLICATIONS

Preliminary Search Report for Application No. FR1872647 dated Oct. 24, 2019.
(Continued)

*Primary Examiner* — Herbert K Roberts
*Assistant Examiner* — John M Royston
(74) *Attorney, Agent, or Firm* — Lerner, David, Littenberg, Krumholz & Mentlik, LLP

(57) ABSTRACT

The invention relates to a heat flux sensor including:
a heating wire (1) including a material capable of being taken to a determined temperature by Joule effect, suited to being connected to an electrical source,
a resonator (2) of nano electro mechanical system (NEMS) type including:
  a beam (20) suspended with respect to a support (21),
  an actuating device (22) capable of generating a vibration of said beam under the effect of an excitation signal,
  a detection device configured to measure a displacement of said beam in the course of said vibration and to emit an output signal having a resonance at the resonance frequency of the resonator, said resonance frequency depending on the temperature of the beam,
wherein one end (20a) of the beam (20) is integral with the heating wire (1) so as to enable a conduction of heat from the heating wire to the beam, a variation in temperature of the
(Continued)

heating wire induced by a variation in a characteristic of a fluid surrounding said wire causing a variation in the resonance frequency of the resonator.

21 Claims, 5 Drawing Sheets

(51) Int. Cl.
*G01N 25/18* (2006.01)
*G01N 30/02* (2006.01)

(58) Field of Classification Search
CPC ......... G01N 2291/0427; G01N 29/036; G01N 29/022; G01F 1/6882
See application file for complete search history.

(56) References Cited

U.S. PATENT DOCUMENTS

| | | | |
|---|---|---|---|
| 2007/0266858 A1* | 11/2007 | Alm | G01N 30/463 96/105 |
| 2013/0214274 A1* | 8/2013 | Merz | G01N 25/18 257/48 |
| 2014/0076024 A1 | 3/2014 | Duraffourg et al. | |
| 2014/0079091 A1 | 3/2014 | Ruellan et al. | |
| 2015/0247828 A1 | 9/2015 | Ruellan et al. | |
| 2015/0290845 A1* | 10/2015 | Hallander | B29C 70/882 428/174 |
| 2015/0300999 A1 | 10/2015 | Andreucci et al. | |
| 2015/0316517 A1 | 11/2015 | Ollier et al. | |
| 2016/0033433 A1* | 2/2016 | Nakano | G01N 33/005 73/25.01 |
| 2018/0266685 A1* | 9/2018 | Fisten | F23Q 7/16 |

FOREIGN PATENT DOCUMENTS

| | | |
|---|---|---|
| FR | 2995691 A1 | 3/2014 |
| FR | 2995692 A1 | 3/2014 |
| FR | 2996219 A1 | 4/2014 |
| FR | 3008690 A1 | 1/2015 |
| WO | 2015082956 A1 | 6/2015 |

OTHER PUBLICATIONS

Wang et al., "MEMS-based gas flow sensors", Microfluidics and Nanofluidics, Published online Jan. 8, 2009, vol. 6, No. 3, pp. 333-346, XP019667839.

* cited by examiner

[Fig 1]
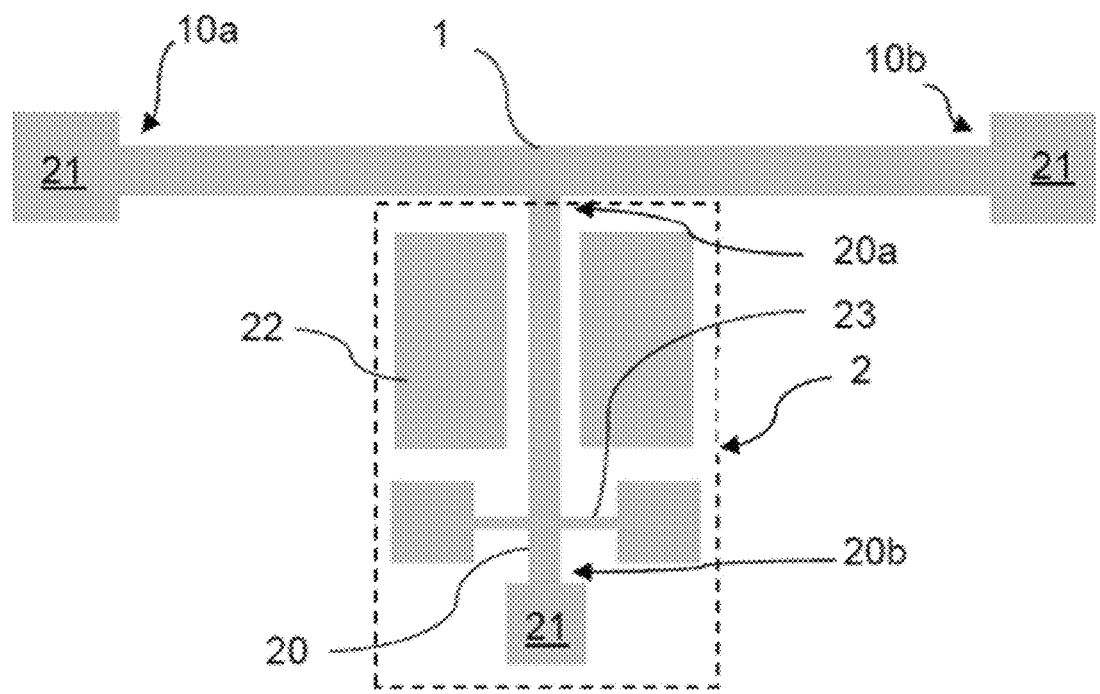
[Fig 2]
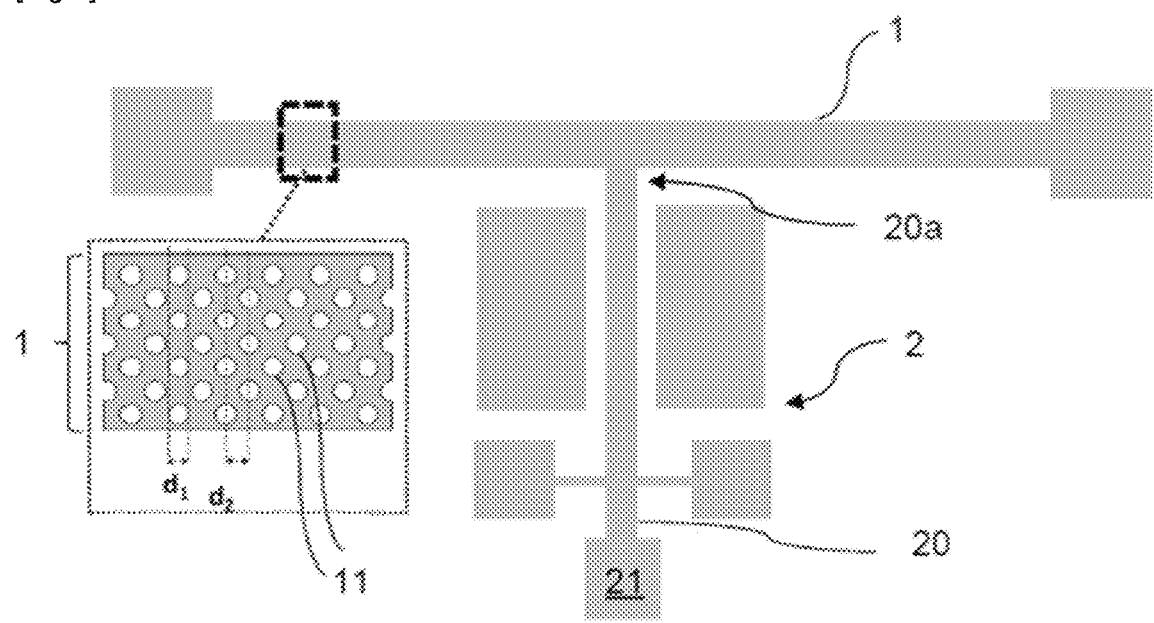

[Fig 3]
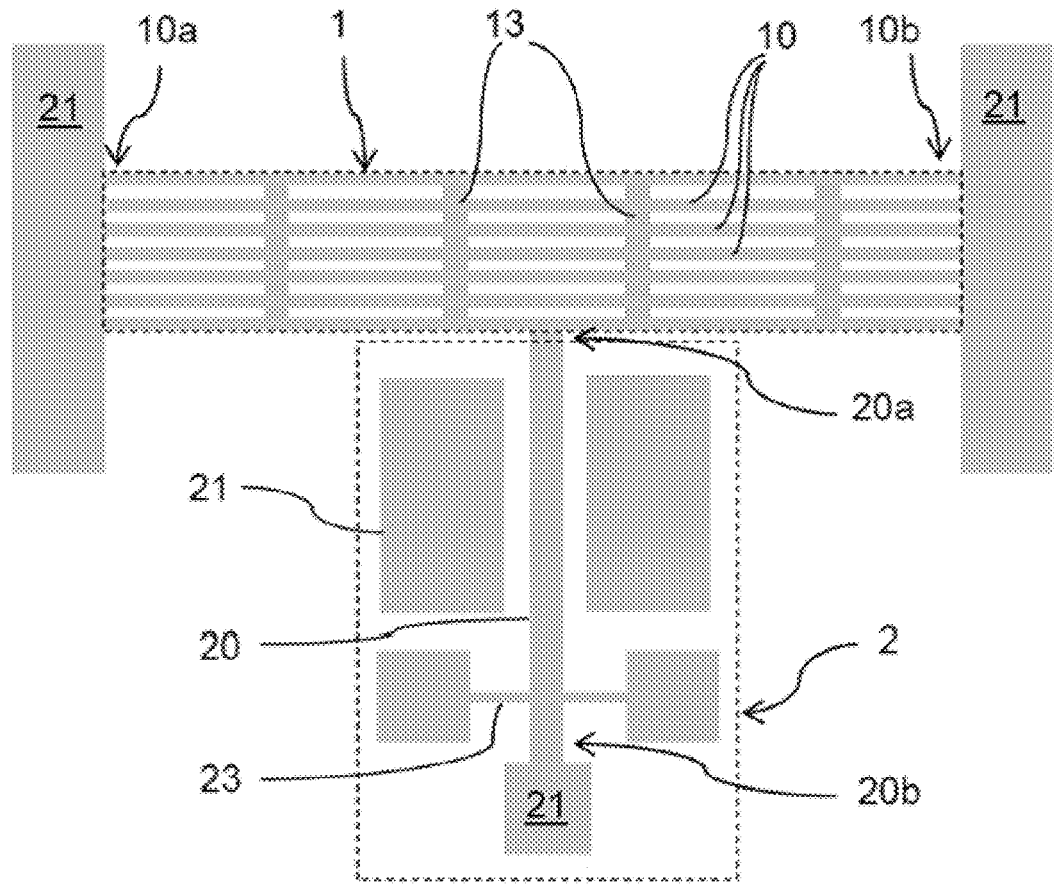
[Fig 4]
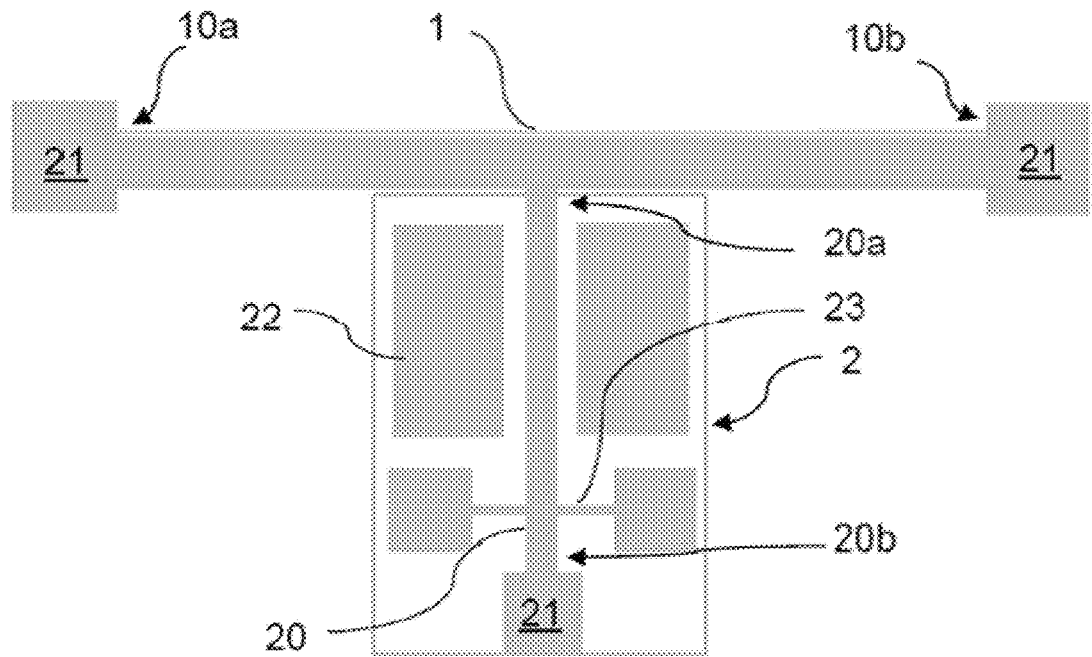

[Fig 5]
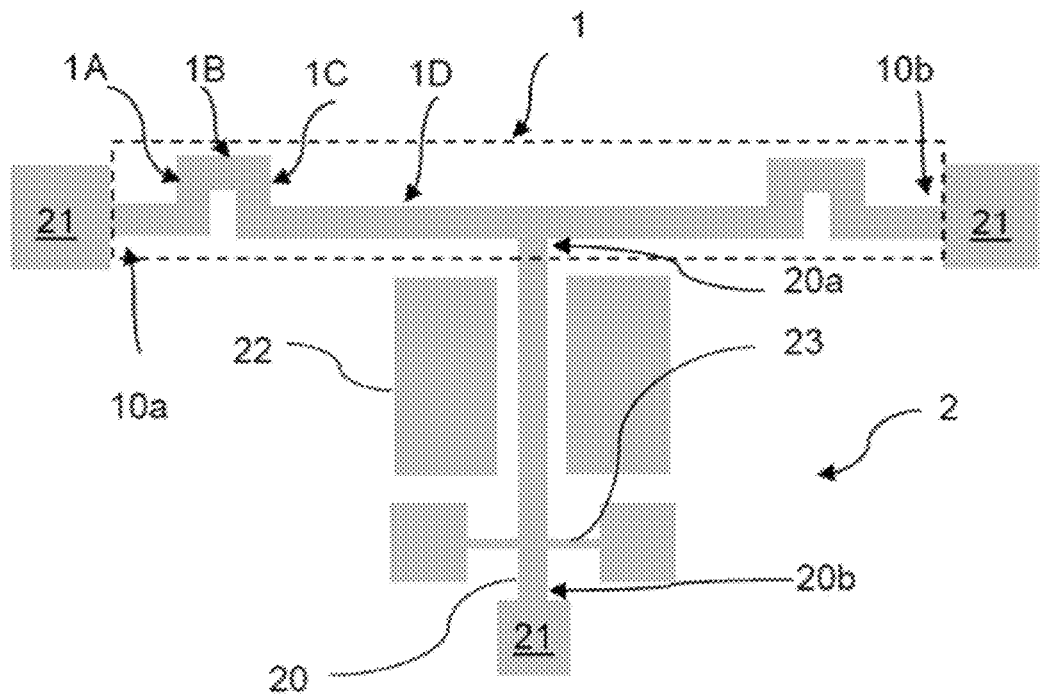
[Fig 6]
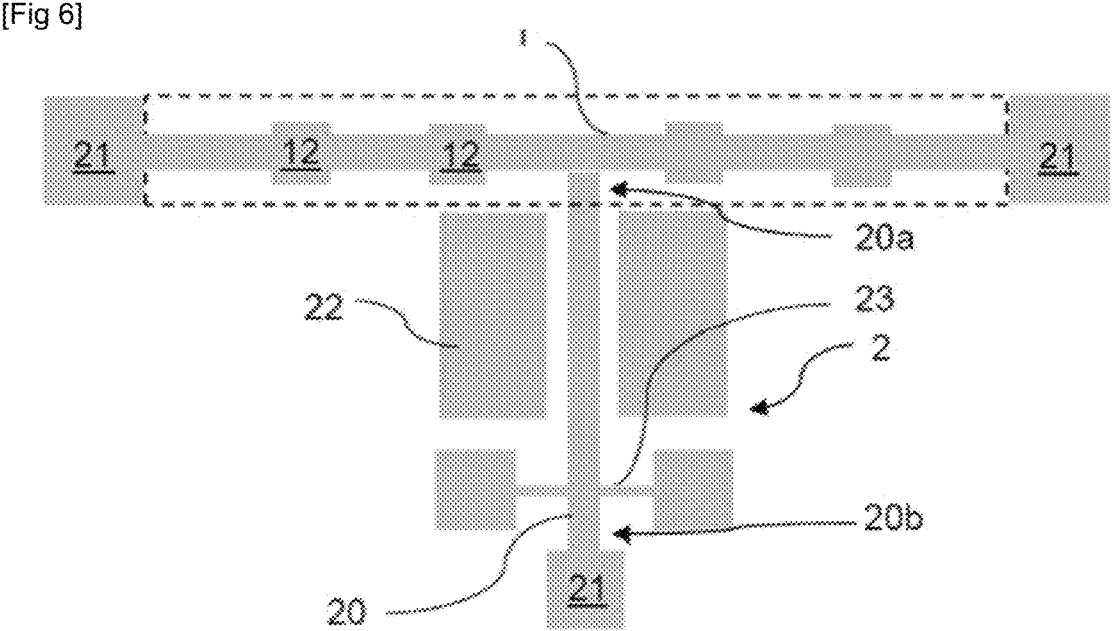

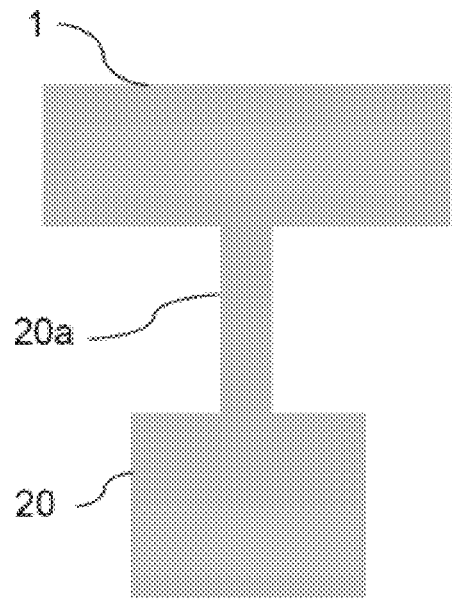
[Fig 7A]
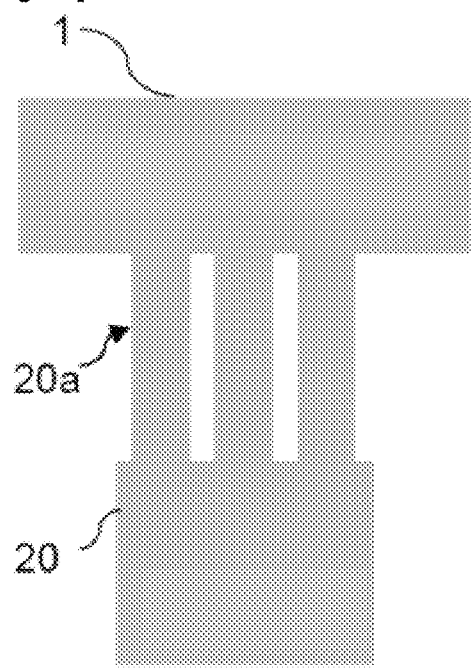
[Fig 7B]

[Fig 7C]
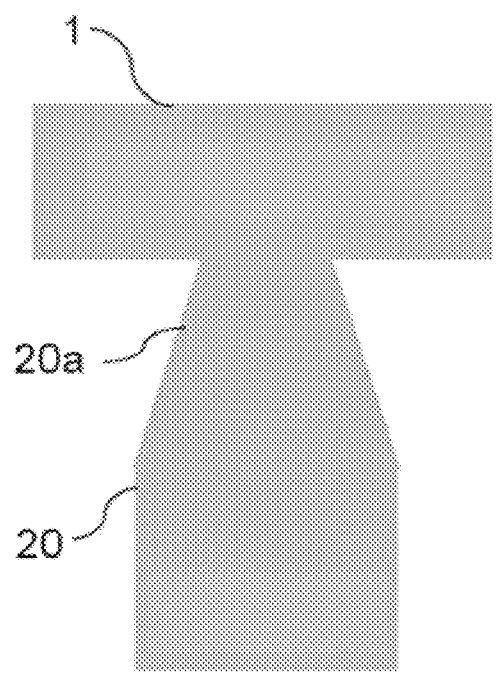

HEAT FLUX SENSOR WITH HEATING WIRE

CROSS-REFERENCE TO RELATED APPLICATIONS

The present application claims priority from French Application No. 1872647 filed Dec. 11, 2018, the disclosure of which is hereby incorporated herein by reference.

FIELD OF THE INVENTION

The present invention relates to a heat flux sensor including a heating wire. Such a heat flux sensor may find application notably in a gas sensor, a gas analysis system or a flow meter.

PRIOR ART

A heat flux sensor makes it possible to measure heat exchange between the body of the sensor and the surrounding medium, which may be gaseous or liquid. Such a measurement technology may be used notably to produce a gas sensor or a pressure sensor.

A gas sensor of TCD (Thermal Conductivity Detector) type works on the principle of the measurement of the electrical resistance of a wire of which the temperature varies as a function of heat exchanges with a surrounding gas through the thermal conductivity of said gas.

Such a sensor may be arranged at the outlet of a gas phase chromatography column through which the different species constituting a gas mixture to analyse are separated.

The sensor includes a heating wire coupled to an electrical source making it possible to heat it by Joule effect, suspended in a volume in which there is a species to detect.

According to the nature of the species in contact with the heating wire, and more precisely its thermal conductivity, thermal exchanges between the heating wire and the species are liable to bring about a variation in temperature of the heating wire and consequently a variation in the electrical resistance of the wire.

This change in electrical resistance, as well as the electrical resistance of an identical wire in contact with a reference gas, are measured by means of a Wheatstone bridge, with a view to determining the concentration of the considered species.

However, this technology has limits in that it requires an important contrast in terms of thermal conductivity between the reference gas and the one or more species to detect.

Furthermore, the wire is generally made of platinum coated with nitride, which are materials having significant stress levels, inducing difficulties of implementation and limits in terms of design of the sensor. This technology is thus difficult to master in practice.

Another type of sensor based on the same measurement principle has been produced on a silicon substrate using micromanufacturing techniques, making it possible to etch the heating wire directly in a silicon layer. This type of sensor has been described in the documents FR 2 995 691, FR 2 995 690 and FR 2 995 692. This technique has an advantage in terms of integration facility.

On the other hand, to have an appropriate electrical resistance of the silicon wire, such a sensor must be produced at the nanometric scale. The result is that the thermal exchange surface between the heating wire and the gas to detect is very small, which limits said exchanges and the capacity of the sensor to detect low gas concentrations.

Other sensors are based on different technologies.

For example, the document WO 2015/082956 describes a resonator of NEMS (Nano Electro Mechanical System) type enabling the measurement of the concentration of gas by gravimetric effect, that is to say the modification in the resonance frequency of the resonator due to a modification in the mass of the resonant structure.

Whatever the technology considered, improvements are expected in terms of sensitivity of the sensor and simplicity of manufacture.

DESCRIPTION OF THE INVENTION

An aim of the invention is to design a heat flux sensor that is simple to manufacture while ensuring good detection sensitivity.

To this end, the invention proposes a heat flux sensor including:
  a heating wire of micrometric dimension including a material capable of being brought to a determined temperature by Joule effect, said wire being suited to being connected to an electrical source,
  a resonator of nano electro mechanical system (NEMS) type including:
    a beam suspended with respect to a support,
    an actuating device capable of generating a vibration of said beam under the effect of an excitation signal,
    a detection device configured to measure a displacement of said beam in the course of said vibration and to emit an output signal having a resonance at the resonance frequency of the resonator, said resonance frequency depending on the temperature of the beam,
  wherein one end of the beam is integral with the heating wire so as to enable a conduction of heat from the heating wire to the beam, a variation in temperature of the heating wire induced by a variation in a characteristic of a fluid surrounding said wire causing a variation in the resonance frequency of the resonator.

Such a sensor is based on the fact that the resonance frequency of the resonator strongly depends on its temperature. The resonator is thus able to detect a variation in temperature of the heating wire under the effect of a variation in a characteristic (for example the composition) of a fluid surrounding said heating wire.

This sensor has the advantage of decoupling the heated part from the measurement part, which makes it possible to optimise each of the two independently of the other. Notably, each part may be produced at a different scale: the heating wire at a micrometric scale to benefit from a sufficiently large thermal exchange surface with the surrounding gas; the resonator at a nanometric scale to benefit from measurement precision.

In an advantageous manner, the heating wire is embedded at its two ends in the support.

According to an embodiment, the heating wire has at least one embedding zone in the support, at a distance from its two ends.

According to an embodiment, the heating wire includes a plurality of coplanar sections inclined with respect to each other.

The heating wire typically has a length comprised between 1 and 500 µm and a transversal dimension comprised between 1 and 50 µm.

According to an embodiment, the heating wire includes a semiconductor material, such as silicon, or a metal, such as platinum, optionally coated with another material.

Preferably, the heating wire has a thickness equal to or greater than the thickness of the beam of the resonator.

According to an embodiment, the heating wire includes through openings distributed on at least one portion of its surface.

According to a particular embodiment, the heating wire is in the form of a network of nanofilaments parallel with each other.

The beam typically has a length comprised between 1 and 100 µm and a transversal dimension comprised between 10 and 500 nm.

According to a preferred embodiment, the beam is formed of a semiconductor material, such as silicon.

According to an embodiment, the beam and the heating wire are made in one piece from a same semiconductor material. The heating wire may then have a doping level such that the electrical resistance of the wire is greater than that of the beam.

The actuating device may be of electrostatic type.

The detection device may include piezoresistive gauges.

In an advantageous manner, the beam extends transversally to the heating wire, preferably perpendicular to a main direction of said heating wire.

According to an embodiment, the junction surface area between the beam and the heating wire is comprised between 1000 and 100000 nm$^2$.

In an advantageous manner, the section and the material of the beam and the heating wire are selected in such a way that the electrical resistance of the beam is greater than that of the heating wire.

According to an embodiment, the junction between the beam and the heating wire is situated in a central region of the heating wire.

The invention also relates to a gas sensor including a heat flux sensor such as described above.

The invention also relates to a gas analysis system including a chromatography column and at least one heat flux sensor such as described above arranged at the outlet of said chromatography column.

The invention also relates to a flow meter including a heat flux sensor such as described above.

DESCRIPTION OF THE FIGURES

Other characteristics and advantages of the invention will become clear from the detailed description that follows, with reference to the appended drawings in which:

FIG. 1 is a schematic diagram of a sensor according to the invention;

FIG. 2 is a diagram of a sensor according to a first embodiment of the invention;

FIG. 3 is a diagram of a sensor according to a second embodiment of the invention;

FIG. 4 is a diagram of a sensor according to a third embodiment of the invention;

FIG. 5 is a diagram of a sensor according to a fourth embodiment of the invention;

FIG. 6 is a diagram of a sensor according to a fifth embodiment of the invention;

FIG. 7A represents a first configuration of the junction between the heating wire and the beam to control the amount of heat withdrawn from the heating wire to the resonator;

FIG. 7B represents a second configuration of the junction between the heating wire and the beam to control the amount of heat withdrawn from the heating wire to the resonator;

FIG. 7C represents a third configuration of the junction between the heating wire and the beam to control the amount of heat withdrawn from the heating wire to the resonator.

Identical reference signs from one figure to the other identify identical elements or elements fulfilling the same function.

For reasons of legibility of the figures, the different elements of the sensor are not necessarily represented to scale.

DETAILED DESCRIPTION OF EMBODIMENTS OF THE INVENTION

The heat flux sensor includes a heating wire, which is intended to be placed in contact with a fluid and to exchange heat with said fluid to make it possible to measure a characteristic thereof.

The heating wire is formed of an electrically conductive material having a determined electrical resistivity or of a semiconductor material; it is connected to an electrical source to take said wire to a determined temperature by Joule effect. The heating wire is integral with a support.

To optimise the sensitivity of the sensor, the heating wire is designed to enable maximum exchange of heat with the surrounding fluid and to limit as much as possible loss of heat with its support. The heating wire is thus advantageously suspended with respect to its support, that is to say that a free space is arranged between the heating wire and the support to enable the fluid to surround the heating wire on all of its faces and to maximise the contact surface between the fluid and the heating wire.

Thus, in the case of application to a gas sensor, a modification of the composition of the gas surrounding the sensor modifies the heat exchanges between the wire and the gas, and thus makes the temperature of the heating wire vary; the measurement of this temperature makes it possible to deduce therefrom the composition of the gas. In the case of application to a flow meter, a variation in velocity of a flow of gas surrounding the sensor modifies the heat exchanges between the wire and the gas and thus also makes the temperature of the wire vary.

The function of measurement of the temperature of the heating wire is fulfilled by a nano electro mechanical system (NEMS) type resonator.

In a manner known per se, such a NEMS resonator includes a beam suspended with respect to a support, an actuating device capable of generating a vibration of said beam under the effect of an excitation signal, and a detection device configured to measure a displacement of said beam in the course of said vibration and to emit an output signal having a resonance at the resonance frequency of the resonator, said resonance frequency depending on the temperature of the beam.

According to a preferred embodiment, the actuating device is of electrostatic type. In this case, the actuating device includes two electrodes situated on either side of the beam, at a distance therefrom. This distance is of the order of several hundreds of nm. The resonance frequency of the resonator is typically of the order of 1 to 100 MHz.

According to a preferred embodiment, the detection device is of piezoresistive type, as described in the document FR 2 996 219. In this case, two piezoresistive strain gauges (referenced 23 in FIGS. 1 to 6) are positioned on either side of the beam, at a distance from its two ends. The dimensions of these gauges are typically of several tens to several hundreds of nm width and thickness and several hundreds of nm to several µm long. However, those skilled in the art could choose any other type of detection, for example capacitive, piezoelectric, magnetic, optic, etc.

One end of the beam is integral with the heating wire so as to enable a conduction of heat from the heating wire to the beam. Thus, a variation in temperature of the heating wire induced by a variation in a characteristic of the fluid surrounding said wire (for example, a variation in the composition of the gas in the case of a gas sensor) causes a variation in the resonance frequency of the resonator which is measured by the detection device. The junction between the beam and the heating wire is advantageously realised in the hottest region of the heating wire, which is generally the central portion of the heating wire. For example, the junction may be realised in the central third of the heating wire.

However, so as not to degrade the performance of the heating wire, the amount of heat withdrawn by the resonator at its junction with the heating wire must be limited.

To make it possible both to maximise the exchange of heat of the heating wire with the surrounding fluid, to maximise the sensitivity of the resonator to temperature and to minimise heat exchange and the passage of electrical current between the heating wire and the beam of the resonator, these two components are advantageously produced at different scales. Thus, whereas the resonator is produced at the nanoscopic scale (the typical dimensions of the beam being from several tens to several hundreds of nanometres side and several micrometres long), the heating wire is produced at the microscopic scale (the characteristic dimensions of the wire being of several micrometres to several tens of micrometres side and several millimetres long).

In a particularly advantageous manner, the heating wire is embedded at its two ends in the support. To minimise the effect of loss of heat at the level of the embeddings, the wire is advantageously designed relatively long compared to its section of contact with the embeddings. To reduce the risk of uncontrolled buckling or deformation of the heating wire (which can potentially lead to its rupture) under the effect of compressive stress, it is possible to integrate therein one or more embedding zones in the support, at a distance from the two ends. It is also possible to increase the length of the heating wire while relaxing potential compressive stresses, by forming a non-rectilinear wire but having a plurality of sections arranged in a same plane parallel to the support but having a different orientation and/or curvature with respect to each other. For example, the wire may have a coil shape.

According to an embodiment, the heating wire has a length comprised between 1 and 500 µm and a transversal dimension (width and/or height) comprised between 1 and 50 µm. The beam has for its part a length comprised between 1 and 100 µm and a transversal dimension (width and/or height) comprised between 10 and 500 nm.

The heating wire and the resonator may each be constituted of a semiconductor material, such as silicon (monocrystalline or polycrystalline, doped or not), germanium, silicon-germanium (SiGe). Optionally, the silicon may be porous, the porosity making it possible to increase thermal exchanges with the surrounding medium.

In an advantageous manner, the heating wire and the resonator are formed in a single piece of a same material, optionally with different doping levels chosen in such a way that the electrical resistance of the heating wire is greater than that of the beam.

In an alternative manner, the heating wire may be a metal wire, for example platinum, optionally coated with a protective layer, for example a layer of silicon nitride.

According to an embodiment, the beam may be covered with a functional layer. Thus, in the application to a gas sensor, the resonance frequency of the resonator is sensitive to the adsorption and the desorption of chemical species and thus enables a gravimetric detection of the species contained in the gas. The sensor is thus more versatile. Gravimetric detection may be optionally favoured by not heating the wire.

For the manufacture of this sensor, reference may be made to documents FR 2 995 690 and FR 3 008 690 which respectively describe a method for manufacturing a heating wire and method for manufacturing a NEMS resonator.

A preferred manufacturing method is based on a semiconductor on insulator (SOI) substrate. Such a SOI substrate includes successively, from its surface, a thin layer of monocrystalline silicon (of several hundreds of nanometres thickness), a buried dielectric layer (for example a silicon oxide ($SiO_2$) layer and a base substrate, for example made of silicon, which serves as mechanical support for the sensor.

This method implements conventional microelectronic techniques, in particular photolithography, implantation, deposition and etching techniques.

In the thin silicon layer are implanted species chosen to obtain the desired electrical resistivity in the zones intended to form respectively the heating wire and the resonator (beam, strain gauges, actuating electrodes). These electrical resistivities may optionally be different between these two zones.

The mechanical structures (heating wire, resonator (beam, strain gauges, actuating electrodes), embeddings, etc.) in the thin superficial silicon layer are next etched in an anisotropic manner. The heating wire and the resonator are thus formed in a single piece in said thin layer, and thus have the same thickness. The embeddings are advantageously produced sufficiently large to ensure good mechanical strength vis-à-vis the support after the release of the mechanical structures. The embeddings thus typically have sides of several µm to several tens of µm.

Then, by successive steps of depositions and etchings of electrically insulating layers ($SiO_2$) and electrically conductive layers (AlSi preferably for the interconnections), metal interconnections are produced between the mechanical structures made of doped silicon.

It is next optionally possible to form a planarizing layer in such a way as to facilitate the later step of packaging of the components by transfer of a cover.

After having locally opened (by anisotropic etching) this planarizing layer above the mechanical structures intended to be freed, an isotropic etching of the buried silicon oxide layer of the SOI substrate is carried out to free the mechanical structures made of silicon intended to be suspended (heating wire, resonator) with respect to the base substrate. The oxide layer is not on the other hand etched—or is only partially etched—at the level of the embeddings.

It is then possible to transfer on top of this structure a cover comprising an etched channel, thus creating a fluidic channel in which the gaseous mixture intended to be analysed is going to circulate.

Said channel may be fluidically connect to the outlet of a gas chromatography column if such a column is implemented upstream of the sensor to separate and identify the compounds of the gaseous mixture.

In an alternative manner, the sensor may be used as a flow meter to measure a gas flow rate.

Naturally, those skilled in the art could choose any other manufacturing method without all the same going beyond the scope of the present invention.

FIG. 1 is a schematic layout of a heat flux sensor according to an embodiment of the invention.

The sensor includes a heating wire 1 which is embedded in a support 21 at its two ends 10a, 10b.

The sensor further includes a NEMS resonator 2.

The resonator includes a beam 20 that is suspended with respect to a support (said support may be the same as that of the heating wire). The beam 20 has one end 20a integral with the heating wire, and one end 20b embedded in the support 21. The beam and the heating wire extend into a plane which is generally parallel to the plane of the support.

In an advantageous manner, the beam is arranged perpendicularly to the heating wire, but in a more general manner the beam may be arranged transversally to the heating wire, with an angle comprised between 10° and 90° between the beam and the heating wire.

FIG. 2 illustrates a particular embodiment of the sensor, wherein the heating wire includes through openings 11 distributed on at least one portion of its surface. These openings may serve during the method for manufacturing the sensor, for facilitating the etching of the support under the heating wire with a view to freeing the heating wire and suspending it with respect to the support. Such openings are in general absent at the level of the embeddings. In the example illustrated, each opening has a diameter $d_1$ of the order of 0.5 µm and is separated from an adjacent opening by a distance $d_2$ of the order of 2 µm. Even if FIG. 2 illustrates openings of identical size and distributed in a regular manner on the surface of the wire, it may also be envisaged to vary the diameter of the openings and/or their distribution density in order to adjust locally the electrical resistance of the heating wire to favour heating in a determined region of the wire.

According to another embodiment, illustrated in FIG. 3, the heating wire 1 may be in the form of a network of nanofilaments 10 parallel with each other in a plane parallel to the support, the beam 20 of the resonator being integral with a nanofilament situated on one side of said network. Said nanofilaments 10 are mechanically connected together by bridges 13 which also procure a thermal link between the nanofilaments. The section of each nanofilament typically has a width and a thickness each comprised between 10 and 500 nm. The spacing between two adjacent filaments may be 10 to 500 nm, or even of the order of a µm. The assembly of said nanofilaments may thus be assimilated with a heating wire in a single piece such as described above. Moreover, by reducing the contact surface between the heating wire and the support wherein the nanofilaments are embedded, said nanofilaments make it possible to reduce thermal losses at the level of the embeddings.

FIG. 4 illustrates an embodiment wherein the heating wire and the resonator are both made of a semiconductor material, such as silicon. The heating wire 1 and the resonator 2 are doped with different doping levels, the two doping zones being delimited by two rectangles. More precisely, the heating wire has a doping level such that the electrical resistance of the wire is greater than that of the beam. The doping level of the beam is also chosen in combination with the section of the beam, to avoid the electrical current that circulates in the heating wire passing into the beam.

FIG. 5 illustrates an embodiment wherein the heating wire is not rectilinear but has portions having different orientations. For example, the filament has a rectilinear central portion 1D, to which the beam of the resonator is connected. The rectilinear central portion 1D is connected to each embedding by a portion having a general U shape, with two sections 1A, 10 perpendicular to the portion 1D connected by a section 1B perpendicular to the sections 1A, 1C, the sections 1A, 1B and 1C extending into the same plane as the portion 1D. For a same spacing between the two ends embedded in the support 21, the length of the wire is thus greater than a rectilinear wire, but nevertheless has a sufficient buckling resistance. Naturally, those skilled in the art could add other sections making it possible to increase the length of the wire and its buckling strength and/or choose other orientations of the sections (for example inclined with each other by a non-right angle). Furthermore, the sections are not necessarily rectilinear but could have a certain curvature.

FIG. 6 illustrates an embodiment wherein the heating wire is embedded in the support 21 not only at its two ends but also at several other zones 12. These additional embeddings make it possible to stiffen the heating wire and to increase its buckling strength.

The different embodiments described previously may optionally be combined.

Furthermore, even though the beam is represented embedded in the support at the level of its end 20b opposite to the heating wire, it could advantageously be free at the level of this end 20b, in order to avoid any heat loss at the level of this end.

In FIGS. 1 to 6, the beam is represented with a constant section over its entire length. However, it is possible to adapt the geometry of the end of the beam ensuring the junction with the heating wire, in order to control the amount of heat withdrawn from the heating wire to the resonator. The junction surface area between the beam and the heating wire is typically comprised between 1000 and 100000 $nm^2$.

FIGS. 7A to 7C thus illustrate different configurations of the junction between the heating wire and the beam making it possible, for a same section of the beam and the heating wire, to reduce the contact surface between the heating wire and the beam in order to reduce the amount of heat withdrawn by the beam and to minimise the passage of electrical current into the beam. In the case of FIG. 7A, the end 20a of the beam 20 has a rectilinear shape of section less than that of the remainder of the beam. In the case of FIG. 7B, the end 20a of the beam 20 is constituted of a plurality of parallel segments of which the total section is less than the section of the remainder of the beam. In the case of FIG. 7C, the end 20a of the beam 20 has a section that decreases progressively in the direction of the heating wire.

FIGS. 7A to 7C are only examples of configurations and those skilled in the art could choose any other shape of the end of the beam to fulfil the desired function without all the same going beyond the scope of the present invention.

The configurations illustrated in FIGS. 7A to 7C may be combined with the embodiments of FIGS. 1 to 6.

REFERENCES

FR 2 995 691
FR 2 995 690
FR 2 995 692
WO 2015/082956
FR 2 996 219
FR 3 008 690

The invention claimed is:
1. A heat flux sensor including:
   a heating wire of micrometric dimension comprised between 1 µm and 500 µm in length and between 1 µm and 50 µm in width including a material capable of being taken to a determined temperature by Joule effect, suited to being connected to an electrical source, a resonator of nano electro mechanical system (NEMS) type including:

a beam suspended with respect to a support, an actuating device capable of generating a vibration of said beam under the effect of an excitation signal, a detection device configured to measure a displacement of said beam in the course of said vibration and to emit an output signal having a resonance at the resonance frequency of the resonator, said resonance frequency depending on the temperature of the beam, wherein one end of the beam is integral with the heating wire so as to enable a conduction of heat from the heating wire to the beam, a variation in temperature of the heating wire induced by a variation in a characteristic of a fluid surrounding said wire causing a variation in the resonance frequency of the resonator.

2. The sensor of claim 1, wherein the heating wire is embedded at both ends in the support.

3. The sensor of claim 1, wherein the heating wire has at least one embedding zone in the support, at a distance from both ends of the heating wire.

4. The sensor of claim 1, wherein the heating wire includes a plurality of coplanar sections inclined with respect to each other.

5. The sensor of claim 1, wherein the heating wire includes a semiconductor material, such as silicon, or a metal, such as platinum.

6. The sensor of claim 1, wherein the heating wire has a thickness equal to or greater than a thickness of the beam of the resonator.

7. The sensor of claim 1, wherein the heating wire includes through openings distributed on at least one portion of a surface of the heating wire.

8. The sensor of claim 1, wherein the heating wire comprises a network of nanofilaments parallel with each other.

9. The sensor of claim 1, wherein the beam has a length comprised between 1 and 100 μm and a transversal dimension comprised between 10 and 500 nm.

10. The sensor of claim 1, wherein the beam is formed of a semiconductor material, such as silicon.

11. The sensor of claim 1, wherein the beam and the heating wire are made in one piece from a same semiconductor material.

12. The sensor of claim 11, wherein the heating wire has a doping level such that an electrical resistance of the wire is greater than an electrical resistance of the beam.

13. The sensor of claim 1, wherein the actuating device is of electrostatic type.

14. The sensor of claim 1, wherein the detection device includes piezoresistive gauges.

15. The sensor of claim 1, wherein the beam extends transversally to the heating wire.

16. The sensor of claim 1, wherein a junction surface area between the beam and the heating wire is comprised between 1000 and 100000 $nm^2$.

17. The sensor of claim 1, wherein a section and a material of the beam and the heating wire are selected in such a way that an electrical resistance of the beam is greater than an electrical resistance of the heating wire.

18. The sensor of claim 1, wherein a junction between the beam and the heating wire is situated in a central region of the heating wire.

19. A gas sensor including at least one heat flux sensor according to claim 1.

20. A gas analysis system including a chromatography column and at least one heat flux sensor according to claim 1 arranged at the outlet of said chromatography column.

21. A flow meter including a heat flux sensor according to claim 1.

* * * * *